United States Patent
Bhuwania et al.

(10) Patent No.: US 10,363,517 B2
(45) Date of Patent: Jul. 30, 2019

(54) SYSTEMS AND METHODS TO DEHYDRATE HIGH ACID GAS STREAMS USING MEMBRANES IN AN OIL AND GAS PROCESSING PLANT

(71) Applicant: Chevron U.S.A. Inc., San Ramon, CA (US)

(72) Inventors: Nitesh Bhuwania, Richmond, CA (US); Shabbir Husain, Houston, TX (US); Daniel Chinn, Danville, CA (US); Ronald P. MacDonald, Mill Valley, CA (US); Tapan K. Das, Albany, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/971,643

(22) Filed: May 4, 2018

(65) Prior Publication Data
US 2019/0105599 A1  Apr. 11, 2019

Related U.S. Application Data

(60) Provisional application No. 62/569,703, filed on Oct. 9, 2017.

(51) Int. Cl.
  *B01D 53/14* (2006.01)
  *C10L 3/10* (2006.01)
  *E21B 43/34* (2006.01)

(52) U.S. Cl.
  CPC .......... *B01D 53/1468* (2013.01); *C10L 3/103* (2013.01); *C10L 3/106* (2013.01); *E21B 43/34* (2013.01); *B01D 2252/204* (2013.01); *B01D 2256/24* (2013.01); *B01D 2257/304* (2013.01);
  (Continued)

(58) Field of Classification Search
  CPC .......... B01D 53/1468; B01D 2257/304; B01D 2252/204; B01D 2290/541; B01D 2256/24; B01D 2311/00; B01D 2311/02; B01D 2311/04; B01D 65/00; B01D 63/00; B01D 61/00; B01D 61/58; C10L 3/103; C10L 2290/548; C10L 2290/46; E21B 43/34; E21B 43/40
  See application file for complete search history.

(56) References Cited

U.S. PATENT DOCUMENTS 7,396,388 B2 *  7/2008  Mitariten ........... B01D 53/0462
                                                     423/228
8,869,890 B2   10/2014  Chinn et al.
(Continued)

*Primary Examiner* — Timothy C Vanoy
(74) *Attorney, Agent, or Firm* — Karen R. DiDomenicis

(57) ABSTRACT

Disclosed are systems and methods for producing oil and gas in a plant while removing hydrogen sulfide and water from fluids produced from oil and gas reservoirs and injecting a sour gas stream containing the hydrogen sulfide into an underground formation. Water-selective membranes are used to debottleneck known systems and methods by removing water from bottlenecked sections of the plant including pretreatment of a sour gas feed to one or more gas processing plants. In other aspects, water-selective membranes are used to debottleneck the pretreatment of an acid gas feed to a Claus unit to convert hydrogen sulfide to sulfur in a gas processing plant. The water-selective membranes pretreat the acid gas feed.

13 Claims, 9 Drawing Sheets

(52) U.S. Cl.
CPC ..... *C10L 2290/10* (2013.01); *C10L 2290/548* (2013.01)

(56) References Cited

U.S. PATENT DOCUMENTS

2017/0157557 A1\* 6/2017 Ding .................... B01D 53/04
2018/0363978 A1 12/2018 Ballaguet et al.

\* cited by examiner

SYSTEMS AND METHODS TO DEHYDRATE HIGH ACID GAS STREAMS USING MEMBRANES IN AN OIL AND GAS PROCESSING PLANT

FIELD

The present disclosure relates generally to the field of producing oil and gas from oil and gas reservoirs while removing hydrogen sulfide from produced fluids produced from the oil and gas reservoirs. The present disclosure further relates to the use of membranes in such production to dehydrate water-saturated sour gas, both in the feed fluids and amine-treated fluids, and further relates to injecting a sour gas stream into an underground formation.

BACKGROUND

Production of fluids from oil and gas reservoirs containing high levels of hydrogen sulfide ($H_2S$) requires the separation of the $H_2S$ from both the produced oil and the produced natural gas and the safe disposal thereof. There are at least two widely practiced methods of processing natural gas with high $H_2S$. In one known method, the entire $H_2S$-containing natural gas stream (also referred to herein as sour gas) is dehydrated, compressed, and reinjected at high pressure in an underground formation. In another known method, the gas is sweetened in an amine unit using amine scrubbing, followed by dehydration, and optionally, fractionation to extract propane and butane prior to being sold as sales gas (containing mostly methane, and some ethane and nitrogen). The $H_2S$ and $CO_2$ removed from gas processing in the amine unit (collectively referred to as acid gas) are sent to a Sulfur Recovery Unit (SRU) where the $H_2S$ is converted to elemental sulfur via the well-known Claus reaction.

In U.S. Pat. No. 8,869,890, the concept of bulk removal of $H_2S$ in existing gas processing plants with high $H_2S$ feeds was introduced. The total $H_2S$ entering the plant could be reduced, effectively providing additional processing capacity, and the high-$H_2S$ permeate gas could be compressed and re-injected into an underground formation. Produced gas from such high $H_2S$ reservoirs is usually water saturated and/or contains a relatively high concentration of water along with the high $H_2S$. Feeds with high $H_2S$ and saturated water can degrade the membrane separation performance of some membranes when water condenses on the membranes. Such membranes include membranes made with cellulose acetate and cellulose triacetate polymers. The membranes therefore require water-saturated feeds to be pre-treated to avoid any water condensation. Sour gas dehydration is practiced in known gas processing plants using molecular sieve dehydration to dehydrate the feed gas but current molecular sieve dehydration practice is limited to feeds with concentrations up to 20 to 30 volume % $H_2S$. Some significant challenges are known with the use of molecular sieves for high $H_2S$ concentration feeds. For one, as a pre-treatment upstream of a membrane, dehydration of sour feeds with molecular sieve zeolites has shown the potential to form carbonyl sulfide (COS), which can cause operational challenges for acid gas treatment and meeting the total sulfur specification on the product gas and LPG. Zeolites may act as a catalyst to promote the reaction of $H_2S+CO_2 \rightarrow COS+H_2O$. Secondly, downstream of a membrane, limited operational experience is available for molecular sieve dehydration of sour gas permeate after compression at greater than 30 volume % $H_2S$. This represents a challenge as the permeate stream from the membrane unit can reach concentrations of 50 volume % or more based on the expected acid-gas removal target.

In other parts of a gas processing plant with a high $H_2S$ feed, amine units are used to remove acid gases, such as $H_2S$ and $CO_2$, from a sour gas stream thus producing an enriched acid gas stream and an enriched hydrocarbon stream. Amine units have at least one amine absorber vessel and at least one regeneration vessel. As a non-limiting example, the acid gas stream may include a small amount of hydrocarbons, typically methane ($C_1$), water vapor, carbon dioxide ($CO_2$), and hydrogen sulfide ($H_2S$). The acid gas stream is then sent to a Claus unit which, is well known to those skilled in the art of treating acid gases that include relatively high concentrations of hydrogen sulfide ($H_2S$). The Claus unit may convert at least a portion of the $H_2S$ in the acid gas stream into elemental sulfur, which may be subsequently transported and sold for commercial uses like fertilizer and production of sulfuric acid.

The acid gas stream sent to the Claus unit is high in $H_2S$ concentration (e.g., greater than 50 volume %) and at low pressure (1-3 barg). Typically, this acid gas comes from the amine regenerator and is cooled for water dewpointing due to a limit on water vapor in the Claus unit feed. Cooling is provided by air coolers or by using cooling water. In arid regions, availability of cooling water is limited and air cooling is limited by the high ambient temperatures. When adequate cooling to remove water cannot be provided, the flow of gas to the Claus units has to be limited. A reduction in the acid gas processing by the Claus units creates a gas processing bottleneck which in turn limits oil production. This problem is most acute in the summer months, when the amine regenerator overhead cooler cannot cool down the gas and condense water out due to high ambient temperatures. While portable coolers can be employed, they are expensive to operate and increase the risk of $H_2S$ exposure each time they are connected and removed from the process lines. Glycol dehydration is not an option as any carryover glycol can thermally shock the Claus catalyst and the low-pressure stream would either have to be compressed or a very large glycol unit would be needed to process the low-pressure gas stream. Aside from being expensive, and being inefficient for low pressure streams, there is little or no experience with molecular sieve dehydration at $H_2S$ concentrations above 20-30 volume %, severely limiting their use. Salt driers are also disadvantaged, because of corrosion and disposal of $H_2S$ saturated brine considerations.

It would be desirable to have economical and simple ways of overcoming the above described challenges.

SUMMARY

In one aspect, a system for de-bottlenecking an integrated oil and gas production plant including hydrogen sulfide removal and sour-gas injection is provided. The system includes: a water-selective membrane for receiving a feed stream comprising water-saturated sour gas containing 1-50% hydrogen sulfide by volume and forming a first retentate stream depleted in water and a first permeate stream enriched in water; a hydrogen sulfide-selective membrane for receiving the first retentate stream to form a second retentate stream depleted in hydrogen sulfide and a second permeate stream enriched in hydrogen sulfide; one or more gas processing plants for receiving the second retentate stream and further processing the second retentate stream to produce sales gases; and a permeate compressor for compressing the second permeate stream and injecting the second permeate stream into an underground formation.

In another aspect, a method for de-bottlenecking an integrated oil and gas production plant including hydrogen sulfide removal and sour-gas injection is provided. The method includes: receiving a feed stream comprising water saturated sour gas containing 1-50% hydrogen sulfide by volume in a water-selective membrane and forming a first retentate stream depleted in water and a first permeate stream enriched in water; receiving the first retentate stream in a hydrogen sulfide selective membrane to form a second retentate stream depleted in hydrogen sulfide and a second permeate stream enriched in hydrogen sulfide; receiving the second retentate stream and further processing the second retentate stream in one or more gas processing plants to produce sales gases; and compressing the second permeate stream and injecting the second permeate stream into an underground formation.

In another aspect, a system for debottlenecking a gas processing plant is provided. The system includes: an air or water cooler for cooling an acid gas stream comprising water-saturated acid gas containing greater than 50% hydrogen sulfide by volume; a knockout drum for separating the cooled acid gas stream into a gas stream and a liquid water stream; a water-selective membrane for receiving the gas stream and forming a retentate stream depleted in water and a permeate stream enriched in water; and a Claus unit for receiving the retentate stream and converting hydrogen sulfide to sulfur in the retentate stream.

In another aspect, a method for debottlenecking a gas processing plant is provided. The method includes: cooling an acid gas stream comprising water saturated acid gas containing greater than 50% hydrogen sulfide by volume; separating the cooled acid gas stream into a gas stream and a liquid water stream; receiving the gas stream in a water selective membrane and forming a retentate stream depleted in water and a permeate stream enriched in water; and converting hydrogen sulfide to sulfur in the retentate stream in a Claus unit.

BRIEF DESCRIPTION OF THE DRAWINGS

These and other objects, features and advantages of the present invention will become better understood referring to the following description and accompanying drawings. The drawings are not considered limiting of the scope of the disclosure. Reference numerals designate like or corresponding, but not necessarily identical, elements. The drawings illustrate only example embodiments. The elements and features shown in the drawings are not necessarily to scale; emphasis instead being placed upon clearly illustrating the principles of the example embodiments. Additionally, certain dimensions or positionings may be exaggerated to help visually convey such principles.

DETAILED DESCRIPTION

Figure 1:
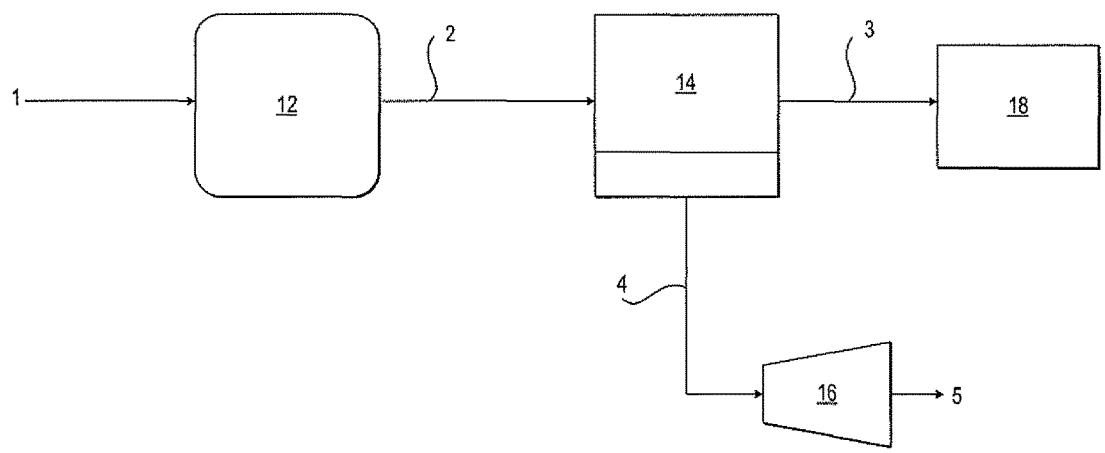
FIG. 1 shows a schematic diagram of a feed section to a gas processing plant in accordance with the prior art.

FIG. 1 shows a schematic diagram of a feed section for pretreating a feed gas 1 from produced fluids from oil and gas reservoirs (not shown) to be further processed in gas plants 18 according to known technology. The feed gas 1 is water saturated and high in hydrogen sulfide concentration, i.e., containing 1-50% hydrogen sulfide by volume. The gas contained in the feed 1 typically has a composition, by way of example and not limitation, including carbon dioxide, hydrogen sulfide, nitrogen, methane, ethane, propane, normal and iso-butane, normal and iso-pentane, normal and isohexane, etc. The feed gas 1 can be dehydrated in dehydration unit 12 using molecular sieves. The dehydrated stream 2 can be fed to a hydrogen sulfide selective membrane 14. The retentate stream 3 is depleted in hydrogen sulfide, and fed to one or more gas plants 18 for further processing. The permeate stream 4 is enriched in hydrogen sulfide. The permeate stream 4 can be compressed in permeate compressor 16, and the resulting compressed stream 5 can be injected into a subterranean formation (not shown). The sour gas injection unit can include wet gas compression, dehydration and dry gas compression, so that a stream of gas containing hydrogen sulfide can be injected into the subterranean formation. The sour gas injection unit can compress the sour gas, as an example, from 1000 psia to 10,000 psia depending on the pressure needed to inject the sour gas into the formation.

Feeds with high $H_2S$ and saturated water can degrade the membrane separation performance of some membranes 14 when water condenses on the membranes. Such membranes include membranes made with cellulose acetate and cellulose triacetate polymers.

Figure 2:
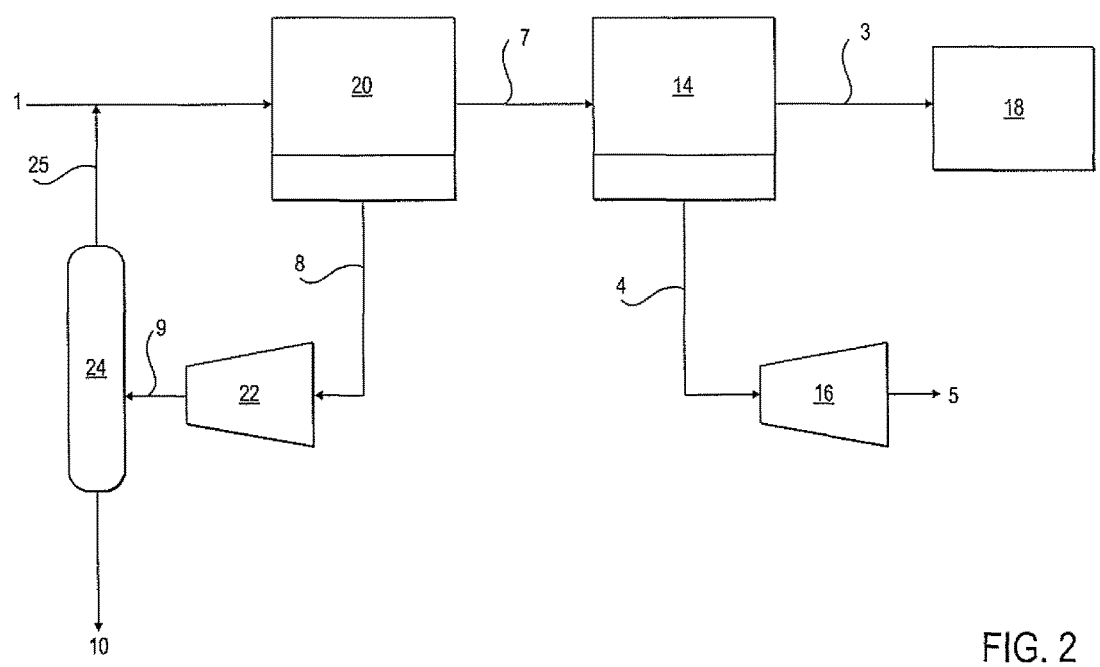
FIG. 2 shows a schematic diagram of a feed section to a gas processing plant in accordance with certain example embodiments.

FIG. 2 shows a schematic diagram of a feed section of a gas processing plant in an exemplary embodiment. The saturated sour feed gas 1 water saturated sour gas containing 1-50% hydrogen sulfide by volume is fed to a water selective membrane 20. Nonlimiting examples of suitable high water selectivity and high water permeance membranes 20 are Nafion® perfluorinated membranes available from Dupont, Aquivion® PHA (perfluorosulfonic acid) ionomer membranes available from Solvay, and molecular sieving membranes such as DDR-type zeolite membranes available from JGC Corporation, Yokohama, Japan.

The retentate stream 7 is depleted in water, and fed to the hydrogen sulfide-selective membrane 14. The water-concentrated permeate stream 8 from the water-selective membrane 20 can be compressed in permeate compressor 22 to form stream 9 which is sent to a knockout drum 24 where liquid water 10 is removed and gas 25 can be recycled to the upstream side of the membrane 20. By recycling the permeate from the water-selective membrane 20, hydrocarbons can be recovered from the permeate 8. In order to retrofit the section of the plant shown in FIG. 1, the dehydration unit 12 is removed and replaced with the water-selective membrane 20. Piping is installed to connect the permeate side of the membrane 20 to the inlet of compressor 22, to connect the outlet of compressor 22 to knockout drum 24, and to connect the gas outlet 25 of knockout drum 24 to the feed side of the water-selective membrane 20.

Figure 3:
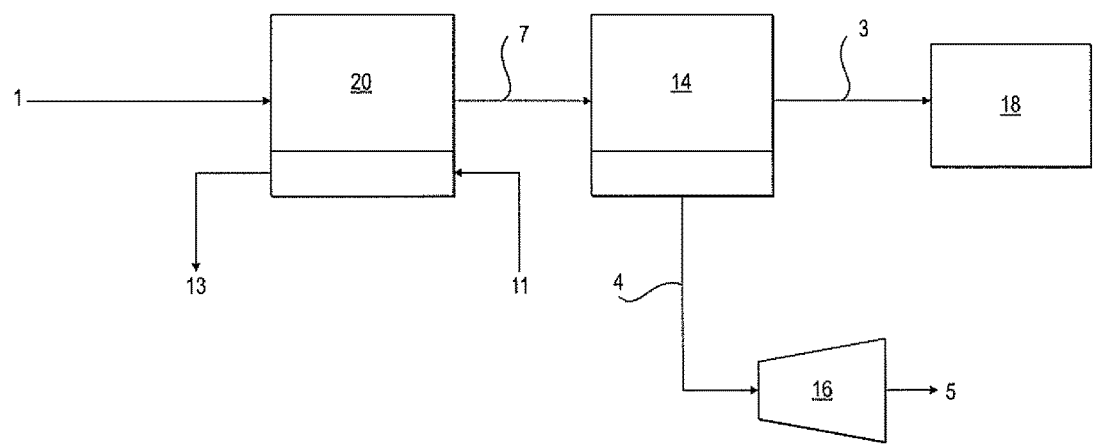
FIG. 3 shows a schematic diagram of a feed section to a gas processing plant in accordance with certain example embodiments.

FIG. 3 shows a schematic diagram of an alternative exemplary embodiment. The process scheme is similar to the scheme shown in FIG. 2, with the recycle of the permeate stream 8 and the associated compressor 22 and knockout drum 24, being replaced by a dry fuel gas or purge gas stream 11 being fed to the permeate side of the membrane 20 to sweep over the permeate side of the membrane 20 and remove the permeate along with the moisture therein. The sweep gas 11 enhances the separation of water by maintaining a maximum water driving force across the membrane 20. The resulting diluted gas stream 13 is sent for disposal, e.g., by burning or including in the fuel gas system. In order to retrofit the section of the plant shown in FIG. 1, the dehydration unit 12 is removed and replaced with the water selective membrane 20. Piping is installed to connect to a source of dry fuel or purge gas 11 to the permeate side of the membrane 20.

Figure 4:
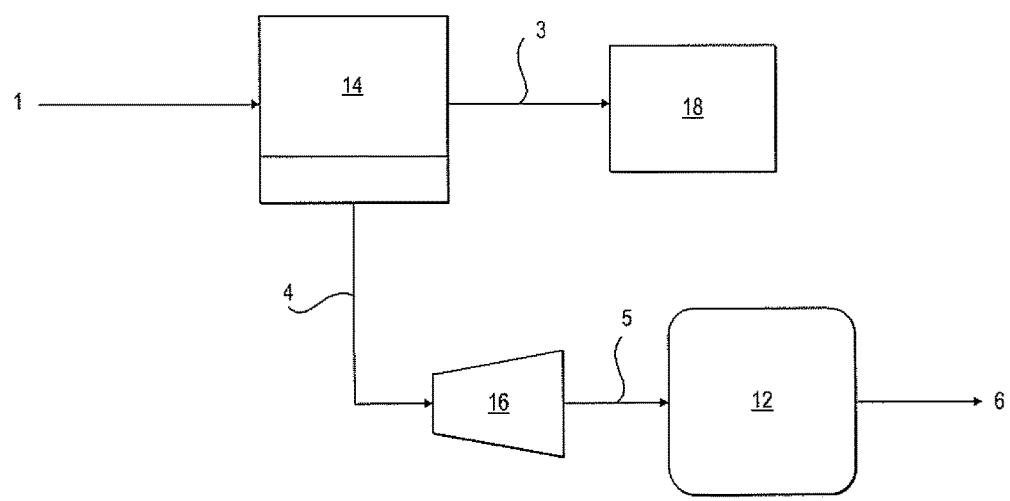
FIG. 4 shows a schematic diagram of a feed section to a gas processing plant in accordance with the prior art.

FIG. 4 shows another schematic diagram of a feed section of a gas processing plant in accordance with the prior art. The water-saturated sour feed gas 1 is fed directly to the hydrogen sulfide and water-selective membrane 14. The membrane 14 can be a water-stable rubbery membrane such as a polyether block amide (e.g., Pebax® available from Arkema Group, King of Prussia, Pa.) or polyurethane membrane. The retentate stream 3 depleted in hydrogen sulfide and water is fed directly to the gas processing plants 18. The permeate stream 4 may optionally be compressed. The permeate gas stream 4 enriched in hydrogen sulfide and water can contain, as an example, up to 40 volume % hydrogen sulfide. The pressure of permeate stream 4 can be, for example, 3-7 bar, and can be compressed to, e.g., 70 bar in permeate compressor 16 having multiple stages of compression. The compressed permeate stream 5 can be dehydrated in dehydration unit 12, and the dehydrated stream 6 can be sent to an injection unit (not shown) for further compression and injection into a subterranean formation (not shown).

Figure 5:
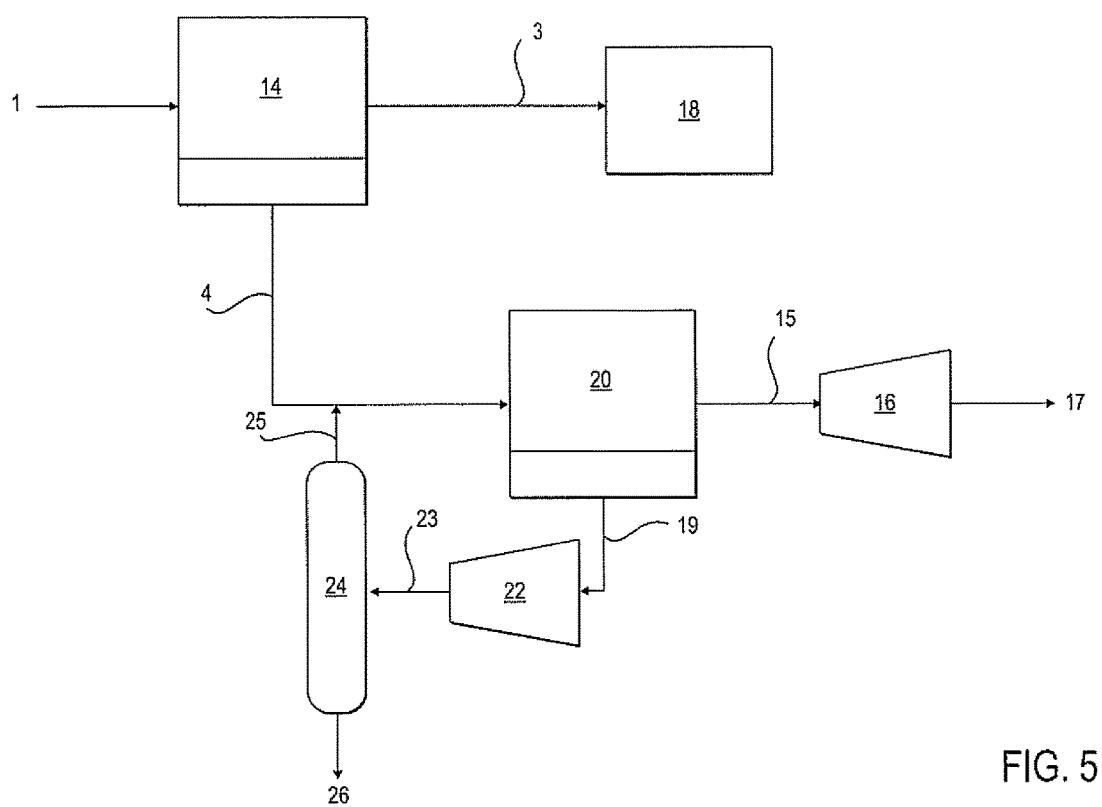
FIG. 5 shows a schematic diagram of a feed section to a gas processing plant in accordance with certain example embodiments.

FIG. 5 shows a schematic diagram of a feed section of a gas processing plant in another exemplary embodiment. The saturated sour feed gas 1 water saturated sour gas containing 1-50% hydrogen sulfide by volume is fed to a hydrogen sulfide and water-selective membrane 14. The retentate stream 3 is depleted in hydrogen sulfide and water. The retentate stream 3 is fed to the gas processing plants 18. The permeate 4, enriched in hydrogen sulfide and water, can be sent to a water-selective membrane 20. The water-depleted retentate stream 15 from the water-selective membrane 20 can be compressed in compressor 16 to form an injection stream 17 for injection into a subterranean formation (not shown). The permeate stream 19, concentrated in water, can be sent to a permeate compressor 22, and the compressed permeate stream 23 can be sent to a knockout drum 24 where liquid water 26 is removed and gas 25 can be recycled to the upstream side of the water-selective membrane 20. By recycling the permeate from the water-selective membrane 20, hydrocarbons can be recovered from the permeate 19. In order to retrofit the section of the plant shown in FIG. 4, the dehydration unit 12 is removed and replaced with the water-selective membrane 20. Piping is installed to connect the permeate side of the membrane 20 to the inlet of compressor 22, to connect the outlet of compressor 22 to knockout drum 24, and to connect the gas outlet of knockout drum 24 to the feed side of the water-selective membrane 20.

Figure 6:
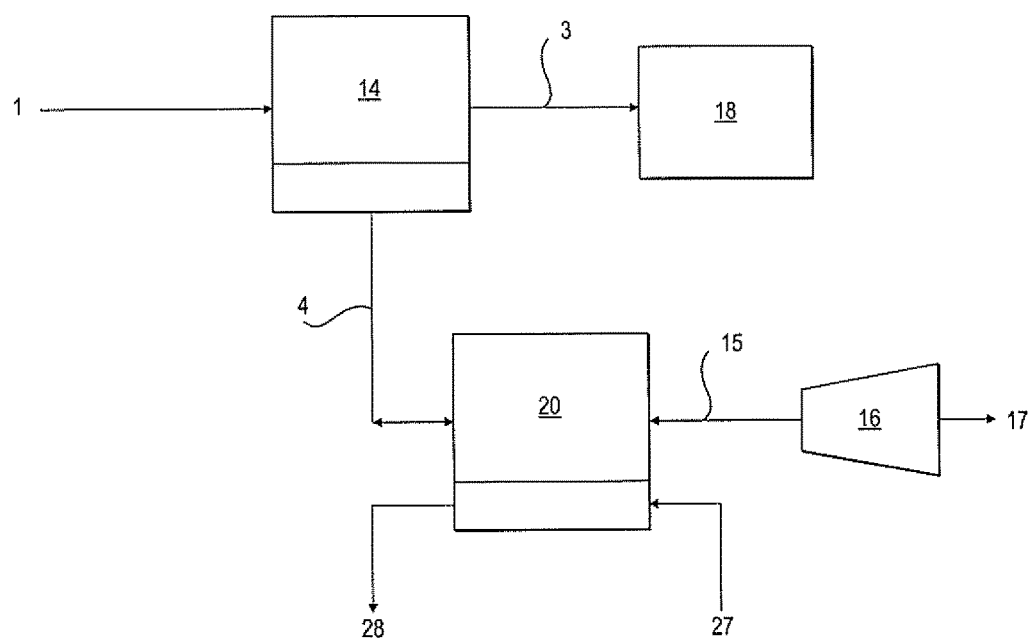
FIG. 6 shows a schematic diagram of a feed section to a gas processing plant in accordance with certain example embodiments.

FIG. 6 shows a schematic diagram of an alternative exemplary embodiment. The process scheme is similar to the scheme shown in FIG. 5, with the recycle of the permeate stream 19 and the associated compressor 22 and knockout drum 24, being replaced by a dry fuel gas or purge gas stream 27 being fed to the permeate side of the membrane 20 to sweep over the permeate side of the membrane 20 and remove the permeate along with the moisture therein. The sweep gas 27 enhances the separation of water by maintaining a maximum water driving force across the membrane 20. The resulting diluted gas stream 28 is sent for disposal, e.g., by burning or sent to the fuel gas system. In order to retrofit the section of the plant shown in FIG. 4, the dehydration unit 12 is removed and replaced with the water-selective membrane 20. Piping is installed to connect to a source of dry fuel or purge gas 27 to the permeate side of the membrane 20.

The use of the schemes shown in FIGS. 2, 3, 5 and 6 advantageously enables dehydration of the saturated sour gas feed 1 at a higher hydrogen sulfide concentration than possible with the prior art scheme while avoiding the formation of COS in conventional molecular sieve dehydration units 12.

Figure 7:
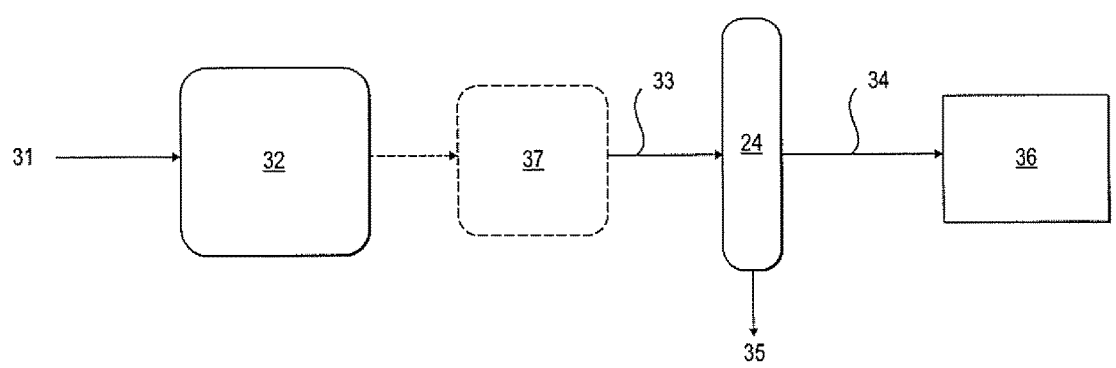
FIG. 7 shows a schematic diagram of a section of a gas processing plant in accordance with the prior art.

FIG. 7 shows a schematic diagram of a section of a gas processing plant in accordance with the prior art in which a hot, water saturated acid gas 31 coining from a regeneration vessel of an amine unit (not shown) is cooled in a cooler 32 which can be a water cooler or an air cooler. Acid gases, such as $H_2S$ and $CO_2$, are removed from gas streams in amine units, thus producing enriched acid gas streams and sweet hydrocarbon streams. The acid gas stream 31 is high in $H_2S$ concentration (e.g., greater than 50 volume %) and at low pressure (1-3 barg). The acid gas 31 may include a small amount of hydrocarbons, typically methane ($C_1$), water vapor, carbon dioxide ($CO_2$). The moisture content of stream 31 is a function of temperature and composition. The composition can be, e.g., 80% $H_2S$, $CO_2$, water and some hydrocarbons. The temperature can be below typical air-cooler temperatures, i.e., 40 to 50° C. Cooling stream 31 means less water which is better for the operation of Claus unit 36. Following the cooler, the cooled stream 33 is passed through a knockout drum 24 to remove liquid water 35, i.e., to separate the cooled acid gas stream into a gas stream and a liquid water stream. The gas 34 having reduced water content is sent to a Claus unit 36 for sulfur recovery. The Claus unit may convert at least a portion of the $H_2S$ into elemental sulfur, which may be subsequently transported and sold for commercial uses like fertilizer and sulfuric acid.

When adequate cooling to remove water cannot be provided, the flow of gas to the Claus unit 36 is limited. Portable cooler 37 can be used to augment the cooling. A reduction in the acid gas processing by the Claus unit 36 creates a bottleneck which in turn limits oil production.

Figure 8:
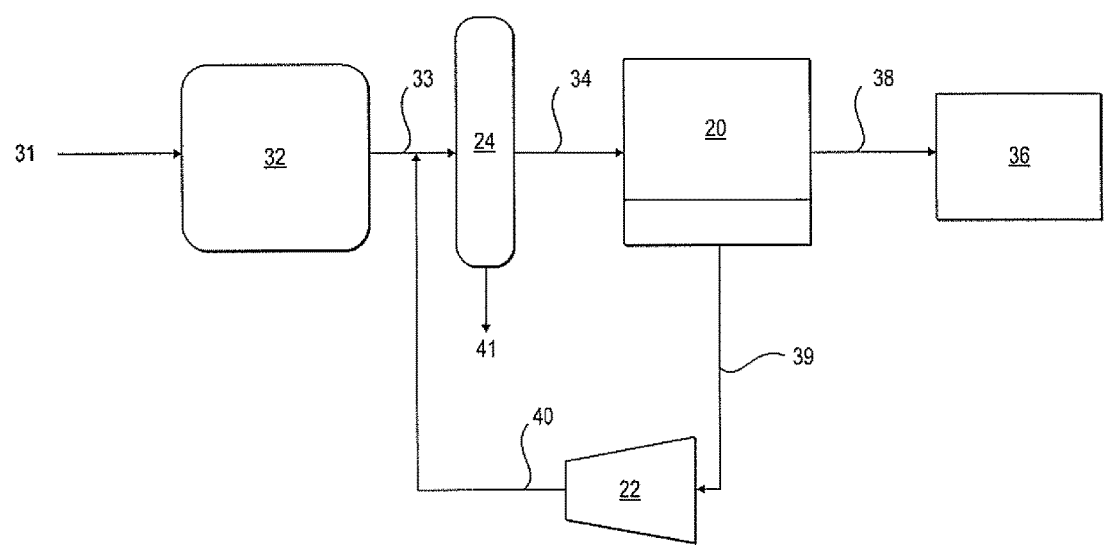
FIG. 8 shows a schematic diagram of a section of a gas processing plant in accordance with certain example embodiments.

FIG. 8 shows a schematic diagram of the section of the gas processing plant in certain example embodiments. In one embodiment, the hot, low-pressure, water saturated regeneration gas stream 31 from the amine regenerator is contacted with a highly water-permeable and water-selective membrane 20 to preferentially remove water. The water-selective membrane 20 forms a retentate stream 38 depleted in water and a permeate stream 39 concentrated in water. The low-volume permeate stream 39 is more concentrated in water than the feed 34. In one embodiment, the permeate stream 39 is compressed in recycle compressor 22 and the compressed stream 40 is returned back upstream of the water knock-out drum 24. The compressed stream 40 is transported in a line to an inlet of the knockout drum 24. The recycling of the permeate stream 39 prevents any loss of hydrogen sulfide from the process. The dried retentate stream 38 is fed to the Claus unit 36 for conversion of hydrogen sulfide to sulfur in the retentate stream 38 at a suitable temperature and moisture content.

Figure 9:
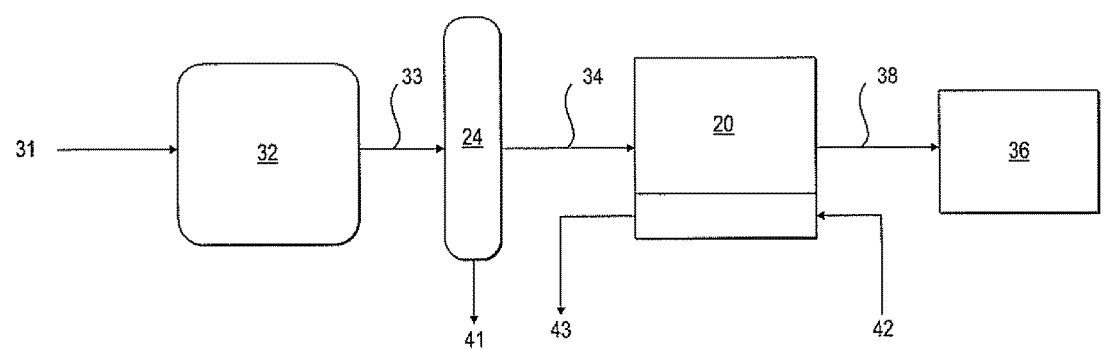
FIG. 9 shows a schematic diagram of a section of a gas processing plant in accordance with certain example embodiments.

In one embodiment, as shown in FIG. 9, the water selective-membrane 20 has a sweep gas inlet on the permeate side of the water selective membrane for receiving a sweep gas of dry fuel gas or dry purge gas 42 on the permeate side of the water-selective membrane 20 to enhance the separation of water by maintaining a maximum water driving force across the membrane 20. The sweep gas 42 carries away water vapor in stream 43. Some $H_2S$ and $CO_2$ permeating through the membrane 20 with the water would be lost into the fuel gas/purge gas stream 43. Likewise, some contamination of the dried retentate gas 38 by methane (from the fuel gas) or other components from the fuel gas/purge gas 42 would take place. The $H_2S$ concentration specification of the fuel gas 42 and or methane concentration specification in the dehydrated stream 38 going to the Claus unit 36 would control the operation and selection of the membrane 20.

Nonlimiting examples of suitable high-water selectivity and high-water permeance membranes 20 are Nafion® perfluorinated membranes available from Dupont, Aquivion® PFSA (perfluorosulfonic acid) ionomer membranes available from Solvay, and molecular sieving membranes such as DDR-type zeolite membranes available from JGC Corporation, Yokohama, Japan.

The use of the schemes shown in FIGS. 8 and 9 advantageously enables dehydration of a water-saturated acid gas stream 31 even in conditions when inadequate cooling is available to remove liquid water using conventional air or water coolers and optional portable coolers. The schemes use non-cooling, non-solvent based processing that does not produce any waste streams to reduce water vapor content in the amine regenerator overhead gas stream by using highly permeable and water-selective membranes. The proposed solution removes the constraint or bottleneck of the water handling capacity of the Claus unit.

It should be noted that only the components relevant to the disclosure are shown in the figures, and that many other components normally part of a gas processing, an oil processing and/or a gas injection system are not shown for simplicity. From the above description, those skilled in the art will perceive improvements, changes and modifications, which are intended to be covered by the appended claims.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof.

Also, "comprise," "include" and its variants, are intended to be non-limiting, such that recitation of items in a list is not to the exclusion of other like items that may also be useful in the materials, compositions, methods and systems of this invention.

What is claimed is:

1. A system for de-bottlenecking an integrated oil and gas production plant including hydrogen sulfide removal and sour-gas injection, comprising:
    a water-selective membrane for receiving a teed stream comprising water-saturated sour gas containing 1-50% hydrogen sulfide by volume and forming a first retentate stream depleted in water and a first permeate stream enriched in water;
    a hydrogen sulfide-selective membrane for receiving the first retentate stream to form a second retentate stream depleted in hydrogen sulfide and a second permeate stream enriched in hydrogen sulfide;
    one or more gas processing plants for receiving the second retentate stream and further processing the second retentate stream to produce sales gases; and
    a permeate compressor for compressing the second permeate stream and injecting the second permeate stream into an underground formation.

2. The system of claim 1 further comprising a recycle compressor for compressing the first permeate stream; a knockout drum for separating the compressed first permeate stream into a gas stream and a liquid water stream and a line for returning the gas stream to the feed stream.

3. The system of claim 1 further comprising a sweep gas inlet on the water selective membrane for providing a sweep gas of thy fuel gas or dry purge gas on a permeate side of the water-selective membrane.

4. A method for de-bottlenecking an integrated oil and gas production plant including hydrogen sulfide removal and sour-gas injection, comprising:
    receiving a feed stream comprising water saturated sour gas containing 1-50% hydrogen sulfide by volume in a water-selective membrane and forming a first retentate stream depleted in water and a first permeate stream enriched in water;
    receiving the first retentate stream in a hydrogen sulfide selective membrane to form a second retentate stream depleted in hydrogen sulfide and a second permeate stream enriched in hydrogen sulfide;
    receiving the second retentate stream and further processing the second retentate stream in one or more gas processing plants to produce sales gases; and
    compressing the second permeate stream and injecting the second permeate stream into an underground formation.

5. The method of claim 4 further comprising compressing the first permeate stream in a recycle compressor; separating the compressed first permeate stream into a gas stream and a liquid water stream and returning the gas stream to the feed stream.

6. The method of claim 4 further comprising providing a sweep gas of dry fuel gas or dry purge gas on a permeate side of the water selective membrane.

7. A system for debottlenecking a gas processing plant, comprising:
    a. an air or water cooler for cooling an acid gas stream comprising water-saturated acid gas containing greater than 50% hydrogen sulfide by volume;
    b. a knockout drum for separating the cooled acid gas stream into a gas stream and a liquid water stream;

c. a water-selective membrane for receiving the gas stream and forming a retentate stream depleted in water and a permeate stream enriched in water; and d. a Claus unit for receiving the retentate stream and converting hydrogen sulfide to sulfur in the retentate stream.

8. The system of claim 7 further comprising a recycle compressor for compressing the permeate stream; and a line for returning the compressed permeate stream to an inlet of the knockout drum.

9. The system of claim 7 further comprising a sweep gas inlet on a permeate side of the water-selective membrane for providing a sweep gas of dry fuel gas or dry purge gas on the permeate side of the water selective membrane.

10. A method for debottlenecking a gas processing plant, comprising:

a. cooling an acid gas stream comprising water saturated acid gas containing greater than 50% hydrogen sulfide by volume;

b. separating the cooled acid gas stream into a gas stream and a liquid water stream;

c. receiving the gas stream in a water selective membrane and forming a retentate stream depleted in water and a permeate stream enriched in water; and d. converting hydrogen sulfide to sulfur in the retentate stream in a Claus unit.

11. The method of claim 10 further comprising compressing the permeate stream; and returning the compressed permeate stream to the cooled acid gas stream.

12. The method of claim 10 further comprising providing a sweep gas of dry fuel gas or dry purge gas on a permeate side of the water selective membrane.

13. The method of claim 10 wherein the acid gas stream comprises from 70 to 80% hydrogen sulfide by volume.

* * * * *